United States Patent
Yang et al.

(10) Patent No.: US 6,953,923 B2
(45) Date of Patent: Oct. 11, 2005

(54) CMOS IMAGE SENSOR HAVING REDUCED NUMBERS OF COLUMN READOUT CIRCUITS

(75) Inventors: Hongli Yang, Cupertino, CA (US);
Xinping He, San Jose, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 255 days.

(21) Appl. No.: 10/368,949

(22) Filed: Feb. 18, 2003

(65) Prior Publication Data

US 2004/0159771 A1 Aug. 19, 2004

(51) Int. Cl.[7] .............................................. H01L 27/00
(52) U.S. Cl. ............................ 250/208.1; 250/214.1; 348/241; 348/302; 348/307; 348/308
(58) Field of Search ...................... 250/208.1, 214.1; 348/241, 302, 307, 308, 310

(56) References Cited

U.S. PATENT DOCUMENTS

| | | | | |
|---|---|---|---|---|
| 5,461,425 A | * | 10/1995 | Fowler et al. ............. | 348/294 |
| 6,222,175 B1 | * | 4/2001 | Krymski .................. | 250/208.1 |
| 6,366,320 B1 | * | 4/2002 | Nair et al. ................. | 348/300 |
| 6,512,546 B1 | * | 1/2003 | Decker et al. ............. | 348/308 |
| 6,697,108 B1 | * | 2/2004 | Chen et al. ................ | 348/241 |

* cited by examiner

*Primary Examiner*—David Porta
*Assistant Examiner*—Davienne Monbleau
(74) *Attorney, Agent, or Firm*—Perkins Coie LLP

(57) ABSTRACT

The image sensor includes a first group and a second group of column readout circuits for reading out pixel signals from said pixels. The total number of column readout circuits in each group is substantially less than the number of columns in the image sensor pixel array. Further included is a multiplexer bus system having selection switches for selectively switching pixel signals from a block of pixels in a column as input into the first group of column readout circuits. The multiplexer bus system also selectively switches pixel signals from another block of pixels in a column as input into a second group of column readout circuits. However, when the first group of column readout circuits is reading and storing said pixel signals, the second group of column readout circuits is transferring out the processed signals. Thus, the first and second groups work alternately.

14 Claims, 2 Drawing Sheets

CMOS IMAGE SENSOR HAVING REDUCED NUMBERS OF COLUMN READOUT CIRCUITS

TECHNICAL FIELD OF THE INVENTION

The present invention relates to CMOS image sensors, and more particularly, to an image sensor that uses multiplexed column readout circuits.

BACKGROUND OF THE INVENTION

Image sensors are used to produce an image representing an object. The image sensors include rows and columns of pixels. The pixels generate small photo signals proportional to light reflected from an object to be imaged. The photo signal is read and processed by signal processing circuitry to create an image representing the object.

Pixels belonging to the same column (also referred to as bitline) are usually connected at a common output node from where the signal is read out. Each pixel in a same bitline is individually controlled to read out at the common output node. At the output node, a column readout circuit is provided to read out and amplify the photo signal. A column readout circuit is also referred to as a line buffer.

Typically, a pixel includes a driving device that receives an electronic signal indicative of an intensity of light detected by the image sensor and drives a current proportional to the intensity (the photo signal), to a bitline to which the pixel cell is coupled. Following signal integration, pixels of a selected row are accessed by asserting a row select signal to each pixel of the selected row.

Additionally, the column readout circuit, in some image sensors, is used to remove thermal noise, fixed pattern noise, and other types of noise. This is done by having the column readout circuit sample the output of the pixel during a reset period. The column readout circuit then subtracts the reset signal from the photo signal. This type of readout circuit is sometimes referred to as a correlated double sampling circuit. In some prior art image sensors, a second stage column readout circuit is used to further amplify the photo signal and to eliminate noise caused by the first stage column readout circuit. An example of a correlated double sampling column readout circuit is seen in U.S. Pat. No. 6,222,175. Another example is shown in our co-pending U.S. patent application Ser. No. 10/109,142 filed Mar. 27, 2002 entitled COLUMN READOUT CIRCUIT WITH INCREASED SIGNAL RANGE FOR CMOS IMAGE SENSOR.

In the prior art, one column readout circuit is associated with each column of the pixel array. For a pixel array with thousands of columns, this requires thousands of column readout circuits. As the drive for smaller and smaller integrated circuits continues, the large number of column readout circuits (which are relatively large), may require an inordinate amount of silicon real estate.

In certain applications, such as a linear sensor, the column readout circuits may make up the bulk of the entire circuit. Further, the large number of column readout circuits may require a large amount of current. A linear sensor is generally characterized as having a pixel array that has much more columns than rows. For example, a linear sensor may have less than five rows, yet thousands of columns. One application for a linear sensor is for an optical scanner or reader.

SUMMARY OF THE INVENTION

The present invention relates to an image sensor that has a reduced number of column readout circuits. A corresponding method of reading out the signals from the image sensor is disclosed. For an image sensor that has a row of pixels having M pixels, the M pixels are grouped into N blocks. Then, a first group of column readout circuits for reading out pixel signals from the said pixels is provided. A second group of column readout circuits for reading out pixel signals from the pixels is also provided. The pixel signals from one of said N blocks is selectively switched to be input into the first group of column readout circuits and another of said N blocks is selectively switched to be input into the second group of column readout circuits. The first group of column readout circuits reads and stores the pixel signals from the pixels while the second group of column readout circuits is transferring out processed signals.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION OF THE PREFERRED EMBODIMENT

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
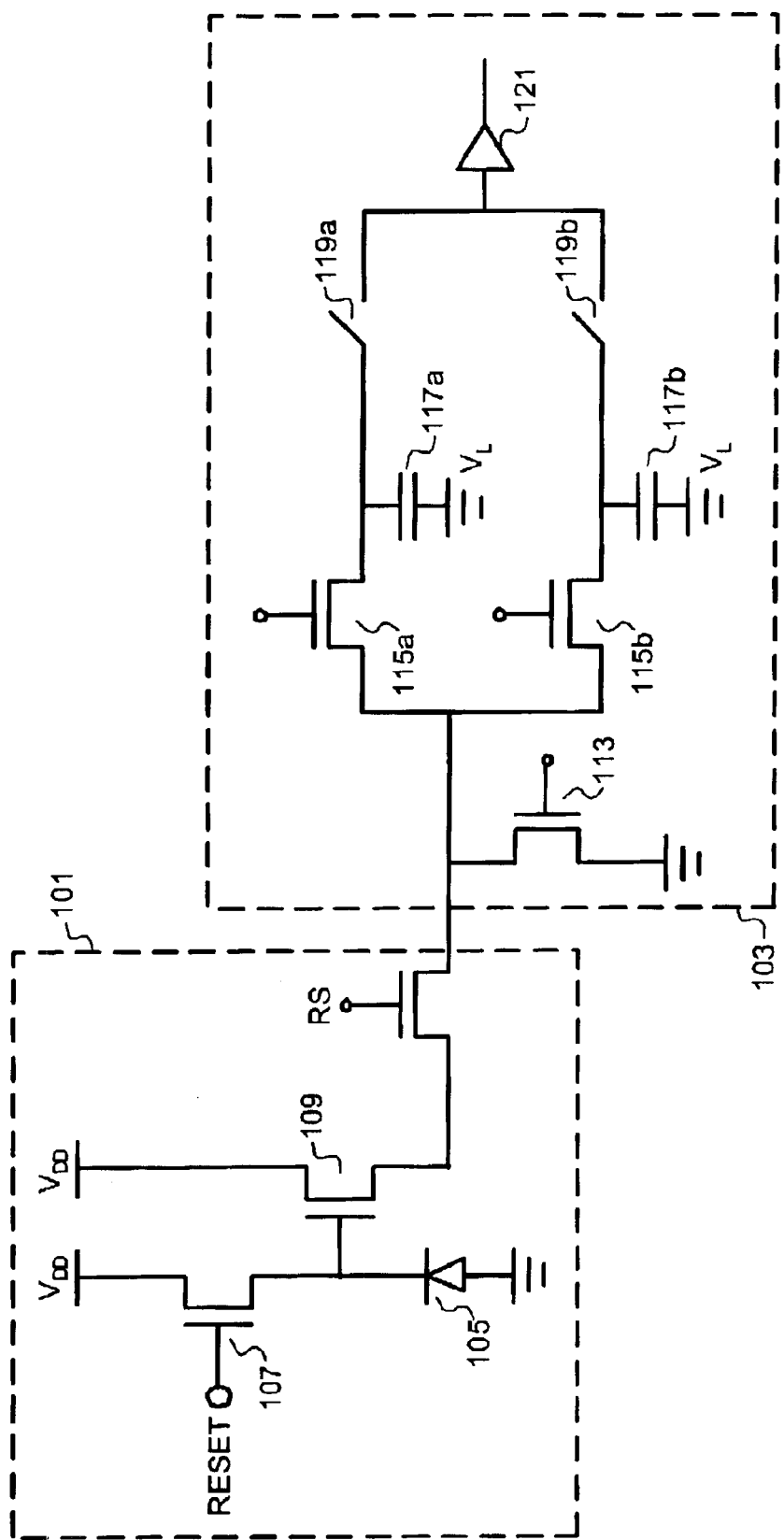
FIG. 1 shows an active pixel coupled to an example of a column readout circuit.

Initially, a description is provided of a typical active pixel that is connected for readout to a column readout circuit. Turning to FIG. 1, an active pixel 101 is shown connected to a column readout circuit 103. The connection is typically made through a signal line that is the same for all pixels within a column, and is commonly referred to as a column signal line. The active pixel 101 includes a photodiode 105, a reset transistor 107, pixel output transistor 109, and row select transistor 111. The configuration of the active pixel 101 is conventional in the prior art. In operation, the photodiode 105 provides a light signal output that is indicative of the amount of light impinging on the photodiode 105. The light signal is used to modulate the pixel output transistor 109 in order to output a photo signal if the row select (RS) transistor 111 is turned on. The pixel output transistor 109 is also referred to as being in source follower configuration. The reset transistor 107 is used to reset the pixel 101 for the next signal integration period. Moreover, while the pixel 101 in one embodiment uses a photodiode 105, the pixel 101 may use a photogate or a pinned photodiode.

The column readout circuit 103 described herein is merely one example of a simplified column readout circuit and should not be construed as limiting. The present invention may be used with other types of column readout circuits. The column readout circuit 103 includes two branches: a first branch for capturing a reset signal and a second branch for capturing the photo signal. Specifically, the source of the pixel output transistor is connected, through row select transistor 111, to both the first and second branches. The use of the two branches allows for correlated double sampling, a technique useful for minimizing 1/f noise and fixed pattern noise. Note that for correlated double sampling, typically a shorting transistor is used between the two branches. However, for clarity purposes, the shorting transistor is omitted from the readout circuit shown in FIG. 1.

The first and second branches are essentially structured the same. For ease of understanding, like elements are designated with like numerals, except that the first branch for capturing the reset signal is designated with an "a" and the second branch for capturing the photo signal is designated with a "b".

The operation of the column readout circuit is next described. The readout circuit operates on two input signals: the photo signal and the reset signal. The photo signal and the reset signal are referred to collectively as "pixel signals". The column readout circuit 103 also includes a load transistor 113 of the pixel output transistor 109. The first and second each include branch select transistors 115$a$ and 115$b$. These act as switches to select the branch to which the signal output by the active pixel 101 is directed.

Downstream of the branch select transistors 115$a$–115$b$ are capacitors 117$a$ and 117$b$. The term downstream refers to locations in the signal path subsequent to a reference location. The capacitors 117$a$–117$b$ have a first plate connected to a voltage $V_L$, which may be $V_{SS}$ or ground. The second plate of the capacitor is connected to the drain of the select transistors 115$a$–115$b$. The capacitors 117$a$–117$b$ may be poly-poly capacitors, metal-metal capacitors, MOS capacitors, or any type of conventional capacitor formed in a semiconductor process. The capacitors are used to store the photo signal and the reset signal in order to perform the correlated sampling.

Additionally, the second plate of the capacitors are connected to read switches 119$a$–119$b$. These read switches 119$a$–119$b$ selectively open and close to read out the various signals on the capacitors 117$a$–117$b$ through a buffer 121. These signals are then subsequently processed to extract the signal from the pixel 101.

Note that in the above column readout circuit 103, a reset signal (also referred to as a reference signal or a black signal) must be stored in capacitor 115$a$ and a photo signal must be stored in capacitor 115$b$. The various switches, such as RS, 115$a$–$b$, 119$a$–$b$, and Reset operate in a predetermined sequence to facilitate readout of the pixel signal.

There are various design tradeoffs between performance, size and speed. For example, larger capacitors 117$a$–$b$ would generally improve the signal to noise ratio of the column readout circuit. However, this would require more silicon real estate as well as slowing down the readout speed. This is because in order to drive the signal onto a large capacitor, this will require a longer time. Alternatively, this may require a larger current driver and more current (therefore power) consumption. Thus, for a given capacitor size and a given current driver, the amount of time required to drive the signal onto the capacitor can be estimated. As will be seen in further detail below, the time it takes to drive the signal will be an important factor in determining the number of column readout circuits required in accordance with the present invention.

As noted above, a CMOS image sensor includes an array of pixels formed into columns and rows. Thus, turning to FIG. 2, an image sensor 201 includes a pixel array 203 formed by a two-dimensional array of pixels 205. The pixels 205, for example, may be active pixels as described above, which include amplification within each pixel 205.

The configuration of the active pixels 205 is conventional. In operation, the pixels 205 provides a light signal output that is indicative of the amount of light impinging on the pixel. At the bottom portion of the pixel array 203 are a plurality of column readout circuits 207. Note that the column readout circuits 207 are shown in the "bottom" of FIG. 1 for convenience purposes, and in actuality, the column readout circuits 207 may be placed almost anywhere on the integrated circuit relative to the pixel array 203.

Figure 2:
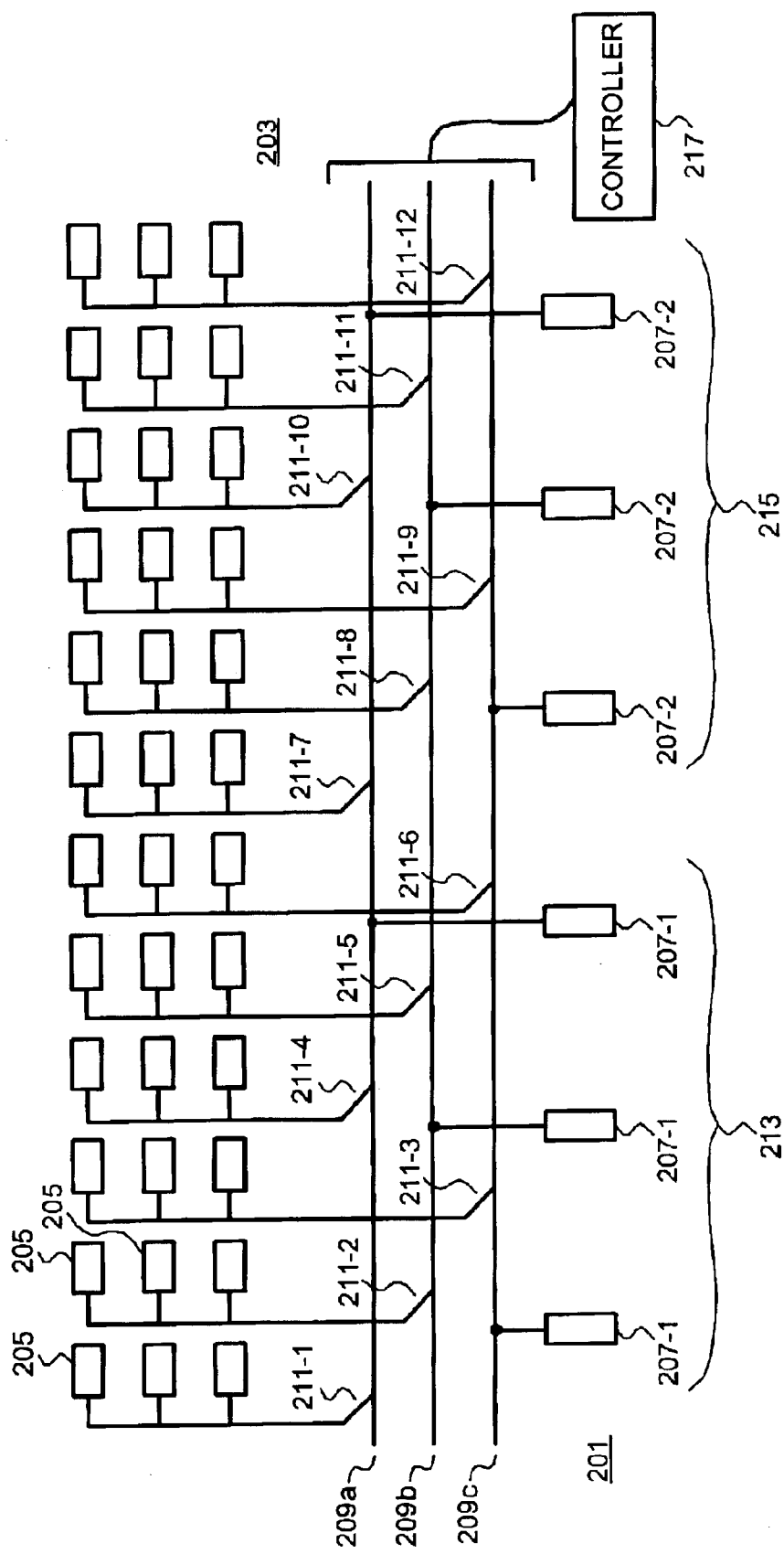
FIG. 2 is a schematic diagram of an image sensor formed in accordance with the present invention.

According to the present invention, two groups of column readout circuits 207 work together in alternating fashion. As seen in FIG. 2, a first group 213 and a second group 215 are shown. The first group 213 and the second group 215 work alternately, such that when the first group 213 is storing the signals onto the storage capacitors (117$a$–$b$) of its column readout circuits 207-1, the second group 215 is reading out the signals (via switches 119$a$ and 119$b$) from its column readout circuits 207-2. Similarly, when the second group 215 is storing the signals onto the storage capacitors (117$a$–$b$), the first group 213 is reading out the signals (via switches 119$a$ and 119$b$). Of course, as seen in FIG. 2, this "multiplexing" will require multiplexer signal busses 209 and block selection switches 211. These can be easily generated using shift register or other methods known in the art.

Depending upon the number of column readout circuits 207 in each group 213 and 215, it may take several repetitions of switching before an entire row of pixels can be read out. In FIG. 2, as one example, there are 12 pixels in one row and the first and second groups 213 and 215 each have 3 column readout circuits 207.

In operation, the signals from the first three pixels of a row are stored by column readout circuits 207-1 of the first group 213. This will require the block selection switches 211-1, 211-2, and 211-3 for the first three pixels be turned "on" so that the column readout circuits 207-1 of the first group 213 can receive the signals. All of the other block selection switches 211-4 through 211-12 for the other nine pixels are turned "off" to avoid signal interference.

After the storage period is complete, the column readout circuits 207-1 of the first group 213 will then read out the signals to further processing circuitry (not shown). At the same time, the block selection switches 211-1 through 211-3 for the first three pixels will switch off. Further, the block selection switches 211-4 through 211-6 will switch on and route their signals to the column readout circuits 207-2 of the second group. The remaining block selection switches 211-7 through 211-12 will remain off.

After the storage period is complete for the pixels 4–6, the column readout circuits 207-2 of the second group 215 will then read out the signals (referred to as processed signals) to further processing circuitry (not shown). At the same time, the block selection switches 211-4 through 211-6 for the pixels 4–6 will switch off. Further, the block selection switches 211-7 through 211-9 will switch on and route their signals to the column readout circuits 207-1 of the first group 213, which have now finished transferring the signals from the first three pixels out. The remaining block selection switches 211-1 through 211-6 and 211-10 through 211-12 will remain off. This alternating process will continue until all of the pixels for a particularly row have been read out. Further, the remaining rows of the pixel array can be read out in a similar manner. The control of the block selection switches 211-1 through 211-12 can be performed by a controller 217 that can be programmed to activate and deactivate the block selection switches to implement the alternating readout through the column readout circuits 207.

While the example of FIG. 2 is for a row having twelve pixels (i.e., columns) and for each group of column readout circuits to have three column readout circuits, it can be appreciated that the concepts and operation of the present invention can be extrapolated to a wide variety of combinations.

Note that unlike the prior art, the number of column readout circuits 207 is substantially less than the number of columns in the pixel array 203. Specifically, in the illustrative embodiment of FIG. 1, the pixel array 203 includes twelve columns and three rows. However, the present invention may be used with any arbitrary sized pixel array 203. The number of columns in the pixel array 203 is twelve, but can also be referred to generally as "M" number of columns or simply M columns.

According to the present invention, the M columns are divided for signal readout purposes into N blocks. For example, in FIG. 2, the M columns may be divided into four blocks (N) of three columns each. Thus, each row is divided into blocks of three pixels each (M divided by N). Again, this is merely illustrative and the value of N may be different. For example, N may be six. In this case, then each block consists of two columns. Thus, each row is divided into blocks of two pixels each (M divided by N).

The number of column readout circuits 207 in both the first and second groups 213 and 215 is then equal to the number of pixels in a block. For FIG. 2 with a value of four for N, this results in blocks of three pixels. Thus, both the first and second groups 213 and 215 have three column readout circuits 207 each. Thus, in this example, only six column readout circuits 207 are required, instead of the conventional twelve column readout circuits.

The present invention takes advantage of the fact that the time it takes to store a signal onto the capacitors of the column readout circuit is generally significantly less than the total readout time allotted for reading out a row. In other words, the row select (RS) signal applied to a particular row is much longer than the time needed to drive the signal onto the capacitors in the column readout circuit. This provides the opportunity to re-use the column readout circuits 207 for other pixels in the same row.

In general, the larger the value of M/N, the easier the timing for the storing and readout of the pixel signals. However, the number of column readout circuits will increase and the number of signal busses 209 will increase, occupying more space.

While the preferred embodiment of the invention has been illustrated and described, it will be appreciated that various changed can be made therein without departing from the spirit and scope of the invention. Thus, one of ordinary skill after reading the foregoing specification will be able to affect various changes, alterations, and substitutions of equivalents without departing from the broad concepts disclosed. It is therefore intended that the scope of the letters patent granted hereon be limited only by the definitions contained in appended claims and equivalents thereof, and not by limitations of the embodiments described herein.

We claim:

1. An image sensor comprising:
   a plurality of pixels arranged as a pixel array of rows and columns, each row having M pixels, said M pixels grouped into N blocks, each of said N blocks having M/N pixels said rows being read out one at a time;
   a first group of column readout circuits having M/N column readout circuits for reading out pixel signals from said pixels from a single row;
   a second group of column readout circuits having M/N column readout circuits for reading out pixel signals from said pixels from said single row; and
   a multiplexer bus system having selection switches for selectively switching pixel signals from one of said N blocks as input into said first group of column readout circuits and another of said N blocks as input into said second group of column readout circuits, wherein said first group of column readout circuits is reading and storing said pixel signals from said pixels while said second group of column readout circuits is transferring out processed signals.

2. The image sensor of claim 1 wherein said pixels are active pixels.

3. The image sensor of claim 1 wherein said first group and said second group include the same number of column readout circuits.

4. The image sensor of claim 1 wherein said column readout circuits are correlated double sampling readout circuits.

5. A method for reading out pixel signals from a row of pixels, said row of pixels including M pixels, said M pixels grouped into N blocks, the method comprising:
   providing a first group of column readout circuits for reading out pixel signals from said pixels from said row of pixels;
   providing a second group of column readout circuits for reading out pixel signals from said pixels from said row of pixels; and
   selectively switching pixel signals from one of said N blocks as input into said first group of column readout circuits and another of said N blocks as input into said second group of column readout circuits, wherein said first group of column readout circuits is reading and storing said pixel signals from said pixels while said second group of column readout circuits is transferring out processed signals.

6. The method of claim 5 wherein said N blocks each contain M/N pixels and said first group of column readout circuits and said second group of column readout circuits each have M/N column readout circuits.

7. The method of claim 5 wherein said first group and said second group include the same number of column readout circuits.

8. The method of claim 5 wherein said column readout circuits are correlated double sampling readout circuits.

9. The method of claim 5 further comprising selectively inputting pixel signals from said N blocks in an alternating fashion to said first and second group of column readout circuits until all N blocks have been processed by either said first or second group.

10. An image sensor comprising:
    a plurality of pixels arranged into a pixel array of rows and columns, said row having M pixels, the pixels of a column outputting pixel signals onto a column signal line, the M pixels being further grouped into N blocks, each of the N blocks having M/N pixels said rows being read out one at a time;

a plurality of multiplexer signal busses, each one of said multiplexer signal busses selectively switchable to an associated set of column signal lines using selection switches;

a first group of column readout circuits for reading out pixel signals from said pixels from a single row, each of said column readout circuits in said first group exclusively associated with one of said plurality of multiplexer signal busses; and a second group of column readout circuits for reading out pixel signals from said pixels from said single row, each of said column readout circuits in said second group exclusively associated with one of said plurality of multiplexer signal busses;

wherein said first group of column readout circuits is operative to readout and store pixel signals from a first block of pixels, while said second group of column readout circuits is transferring out processed signals;

further wherein said first group and second group work alternately reading out and storing pixel signals and transferring out processed signals from blocks of pixels until the pixel signals from the N blocks of pixels have been processed.

11. The image sensor of claim 10 wherein the number of column readout circuits in said first group is equal to the number of column readout circuits in said second group.

12. The image sensor of claim 11 wherein the number of column readout circuits in said first and second group is equal to the number of multiplexer signal busses.

13. The image sensor of claim 10 wherein the total number of column readout circuits in said first and second groups is less than or equal to M/2.

14. The image sensor of claim 10 wherein said column readout circuits are correlated double sampling readout circuits.

* * * * *